(12) United States Patent
Tsai

(10) Patent No.: US 8,773,727 B2
(45) Date of Patent: Jul. 8, 2014

(54) DOCUMENT SCANNING SYSTEM USING MULTIPLE IMAGE SENSORS AND METHOD OF THE SAME

(75) Inventor: Chia-Chiang Tsai, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 273 days.

(21) Appl. No.: 13/330,809

(22) Filed: Dec. 20, 2011

(65) Prior Publication Data

US 2012/0268800 A1 Oct. 25, 2012

(30) Foreign Application Priority Data

Apr. 25, 2011 (TW) .............................. 100114341 A

(51) Int. Cl.
*H04N 1/40* (2006.01)
*H04N 1/04* (2006.01)
(52) U.S. Cl.
USPC ............................ 358/448; 358/474; 358/450
(58) Field of Classification Search
None
See application file for complete search history.

(56) References Cited

U.S. PATENT DOCUMENTS

| 7,633,655 B2 * | 12/2009 | Yang | 358/474 |
| 2003/0098998 A1 * | 5/2003 | Ichihashi | 358/406 |

* cited by examiner

*Primary Examiner* — Firmin Backer
*Assistant Examiner* — Christopher D Wait
(74) *Attorney, Agent, or Firm* — Novak Druce Connolly Bove + Quigg LLP

(57) ABSTRACT

A image generating apparatus and method for scanning documents using multiple image sensors are disclosed. The image generation apparatus comprises a glass plate configured to hold a document placed upside down on the glass plate; a calibration pattern placed on the glass plate; a plurality of image sensors arranged under the glass plate, wherein each of the plurality of image sensors is configured to capture and generate a raw image, the raw image covers a portion of the document and a portion of the calibration pattern through the glass plate; and a processing unit capable of combining all raw images generated by the plurality of image sensors based on the portion of the calibration pattern in the raw image captured by each of the plurality of image sensors, and the processing unit is further configured to generate a complete image of the document.

16 Claims, 6 Drawing Sheets

DOCUMENT SCANNING SYSTEM USING MULTIPLE IMAGE SENSORS AND METHOD OF THE SAME

BACKGROUND

1. Technical Field

The disclosure generally relates to systems and methods for scanning documents, and particularly relates to systems and methods for scanning documents using multiple image sensors.

2. Description of Related Art

An image scanner can optically scan a picture, printed text, handwriting, or a document of any other type, and convert it to a digital image. Many image scanners are flatbed scanners, or hand-held scanners. Within a flatbed scanner, a scanned document is usually placed upside down on a glass window, under which a plurality of image sensors is arranged. Each of the image sensors may capture and generate an image of a portion of the document. Therefore, there is a need for a technique for recombining the individual images captured by multiple image sensors and further processing to generate a complete image of the document.

BRIEF DESCRIPTION OF THE DRAWINGS

Many aspects of the embodiments can be better understood with reference to the following drawings. In the drawings, the emphasis is placed upon clearly illustrating the principles of the embodiments.

DETAILED DESCRIPTION

The disclosure is illustrated by way of example and not by way of limitation in the figures of the accompanying drawings. It should be noted that references to "an" or "one" embodiment in this disclosure are not necessarily to the same embodiment, and such references can mean "at least one."

In general, the word "module," as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
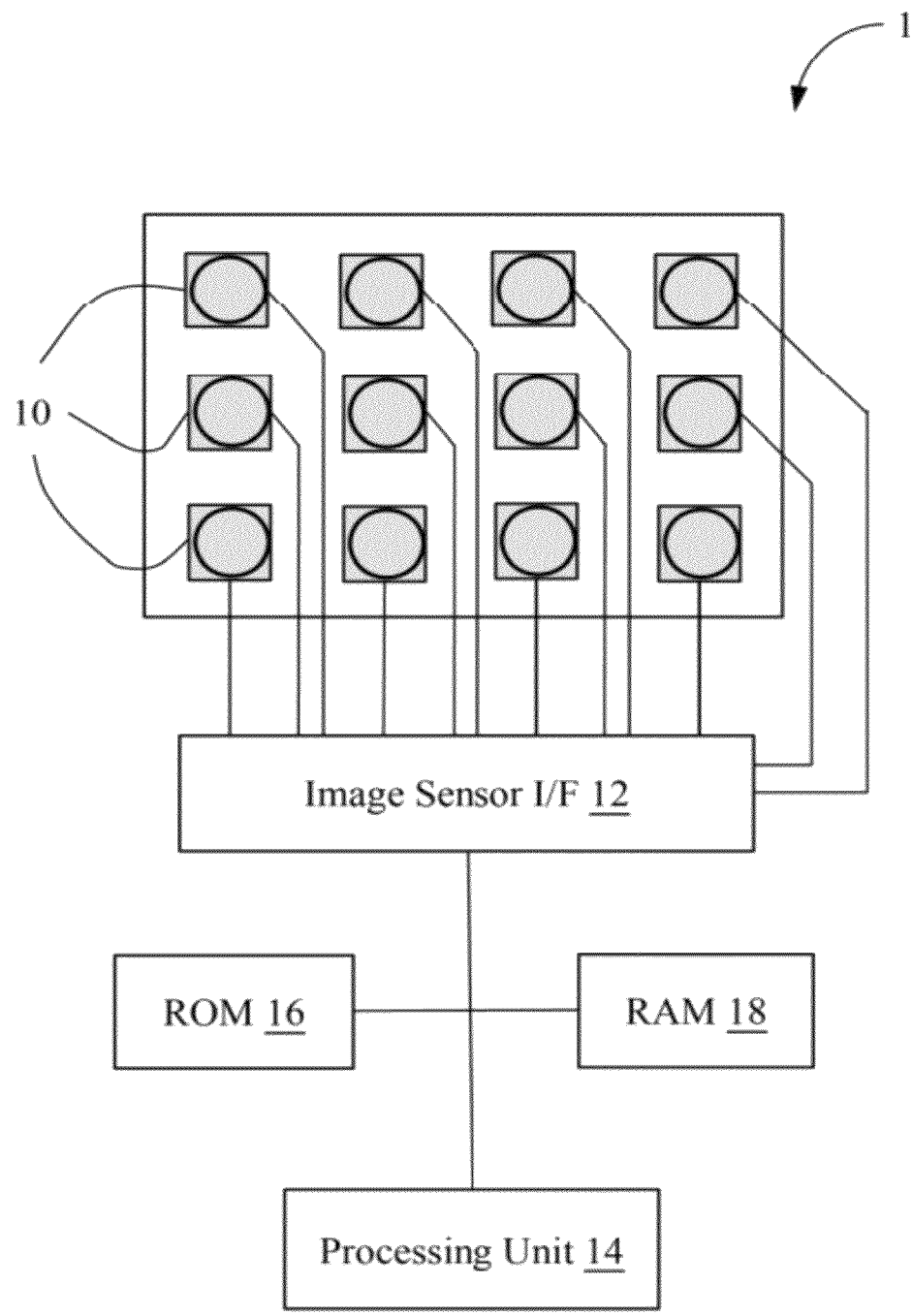
FIG. 1 is a functional block diagram of a flatbed scanner, an example of an image generation apparatus, according to one embodiment.

FIG. 1 is a functional block diagram of a flatbed scanner 1, which is an example of an image generation apparatus according to one embodiment. The flatbed scanner 1 comprises an array of image sensors 10, an image sensor interface (I/F) 12, a processing unit 14, a read-only memory (ROM) 16, and a random access memory (RAM) 18.

The image sensors 10 may be charge-coupled device (CCD) imagers or CMOS imagers, which detect light reflected from objects and can convert it to digital images. The image sensors 10 may be arranged in a two-dimensional matrix. In an example shown in FIG. 1, the image sensors 10 are arranged in a 3×4 matrix. Each of the image sensors 10 may capture and generate an image of a portion of the scanned document.

The image sensor I/F 12 provides an interface which allows the image sensors 10 to communicate with the processing unit 14 and the RAM 18. All the image sensors 10 are connected to the image sensor I/F 12 and managed by the processing unit 14 via the image sensor I/F 12.

The processing unit 14 is a processor for controlling the flatbed scanner 1 overall. The flatbed scanner 1 is controlled by running one or more executable software programs or firmware stored in the ROM 16.

The ROM 16 is non-volatile memory that stores the one or more programs for controlling the flatbed scanner 1.

The RAM 18 is volatile memory which is used as a working area when the processing unit 14 runs the one or more programs stored in the ROM 16. The RAM 18 is also used as buffer memory for temporarily storing image data received from the image sensors 10.

Figure 2:
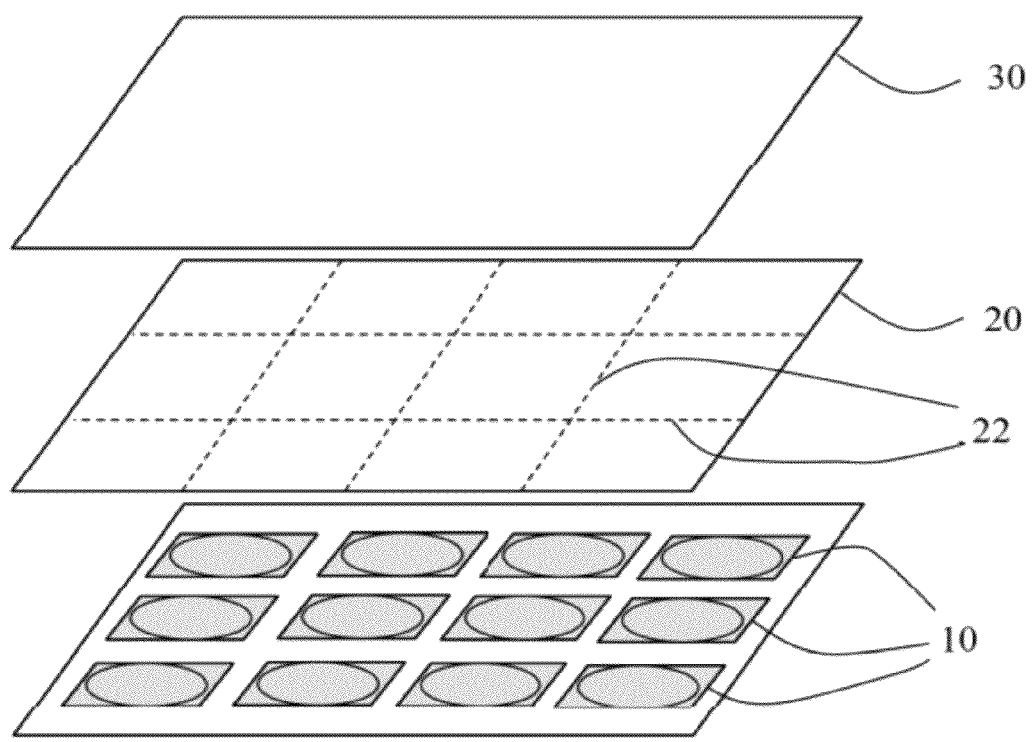
FIG. 2 illustrates a configuration of image sensors, a glass plate and a document to be scanned in the flatbed scanner of FIG. 1.

The flatbed scanner 1 further comprises a glass plate 20 as illustrated in FIG. 2. The glass plate 20 is a transparent platform, on which a document 30 can be placed for scanning. The array of image sensors 10 is arranged under the glass plate 20 and each of the image sensors 10 may capture and generate a raw image of a portion of the document 30 through the glass plate 20. The processing unit 14 then may combine those raw images captured by the image sensors 10 and generate a complete image of the document 30.

In order to facilitate the combining process, a calibration pattern 22 is placed on the glass plate 20. In the embodiment illustrated in FIG. 2, the calibration pattern 22 is composed of a plurality of index lines which may be dotted lines or dashed lines. The plurality of index lines of the calibration pattern 22 divide the glass plate 20 into a plurality of small areas. In one embodiment, the number of the divided areas is equal to the number of the image sensors 10. Each of the image sensors 10 corresponds to one divided area. When the image sensors 10 receive light reflected from the document 30, the plurality of index lines of the calibration 22 will be captured by the image sensor 10 as well. A raw image generated by one of the image sensors 10 may cover both a portion of the document 30 and a portion of the calibration pattern 22.

Figure 3:
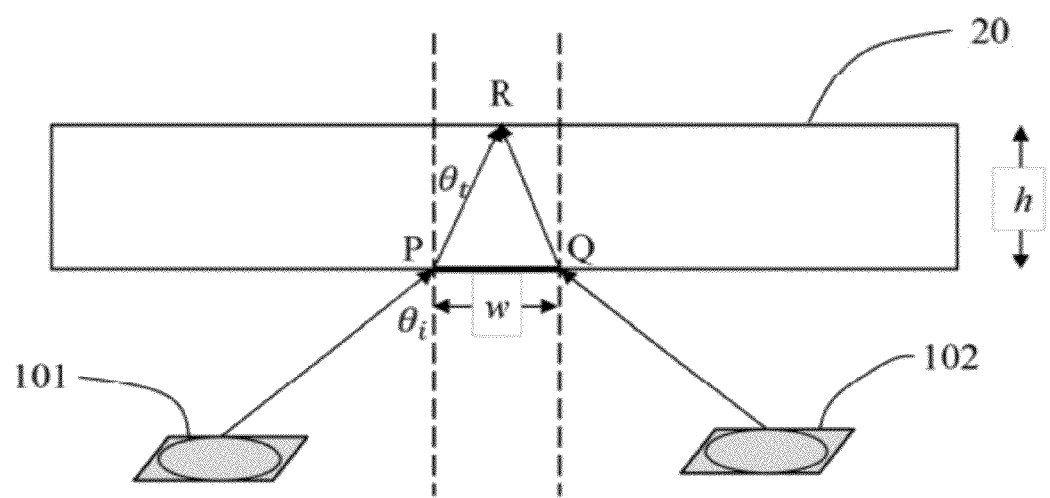
FIG. 3 is a schematic view showing light refraction from two adjacent image sensors through the glass plate of FIG. 2.

The calibration pattern 22 may be placed on either the upper surface or the lower surface of the glass plate 20. If the calibration pattern 22 is placed on the lower surface of the glass plate 20 (furthest away from the document 30), the width of each of the plurality of index lines of the calibration pattern 22 should be as small as visibly possible. In another word, it must be less than a maximum value. FIG. 3 illustrates a schematic view showing the refraction of light from two adjacent image sensors 101 and 102, through the glass plate 20. Refraction occurs at the boundary, when light passes from air into the glass plate 20. According to the law of refraction and the definition of trigonometric function, the maximum value may be obtained by using an equation as follows:

$$w = \frac{2*h*\sin\theta_i}{\sqrt{n^2 - \sin^2\theta_i}}$$

where w represents the maximum value, h represents the thickness of the glass plate 20, $\theta_i$ represents one half of the divergence angle of the two adjacent image sensors 101 and 102, and n represents the refraction index of the glass plate 20.

Figure 4:
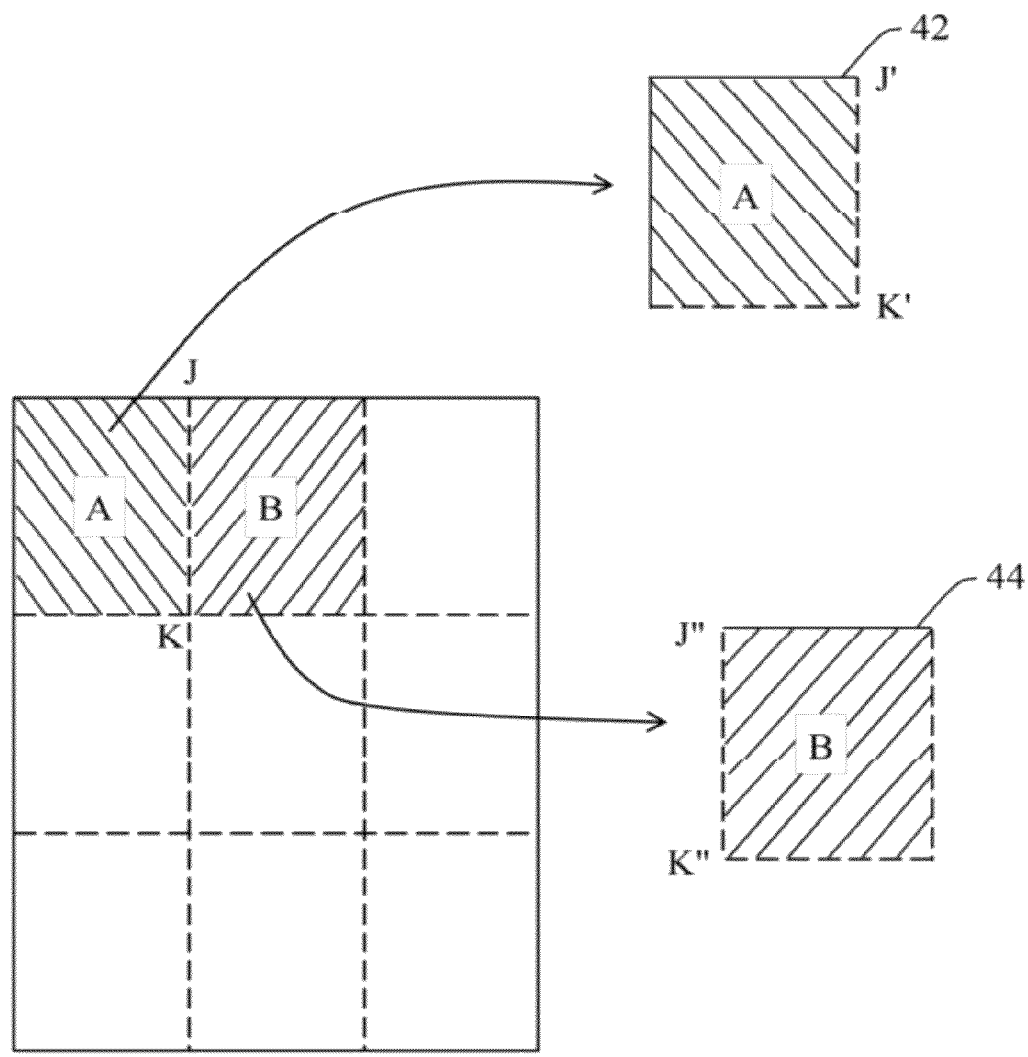
FIG. 4 shows an example of two raw images captured by the image sensors according to one embodiment.

FIG. 4 shows an example of two raw images 42 and 44 converted from the data captured by the image sensors 10. The two raw images 42 and 44 respectively cover a portion A and a portion B of the document 30. The portions A and B are adjacent to each other and divided by an index line JK, which is a portion of the calibration pattern 22. When the data for the two raw images 42 and 44 is captured, the index line JK may be included in both, which is marked as J'K' in the final raw image 42, and J"K" in the final raw image 44, as depicted in FIG. 4.

Figure 5:
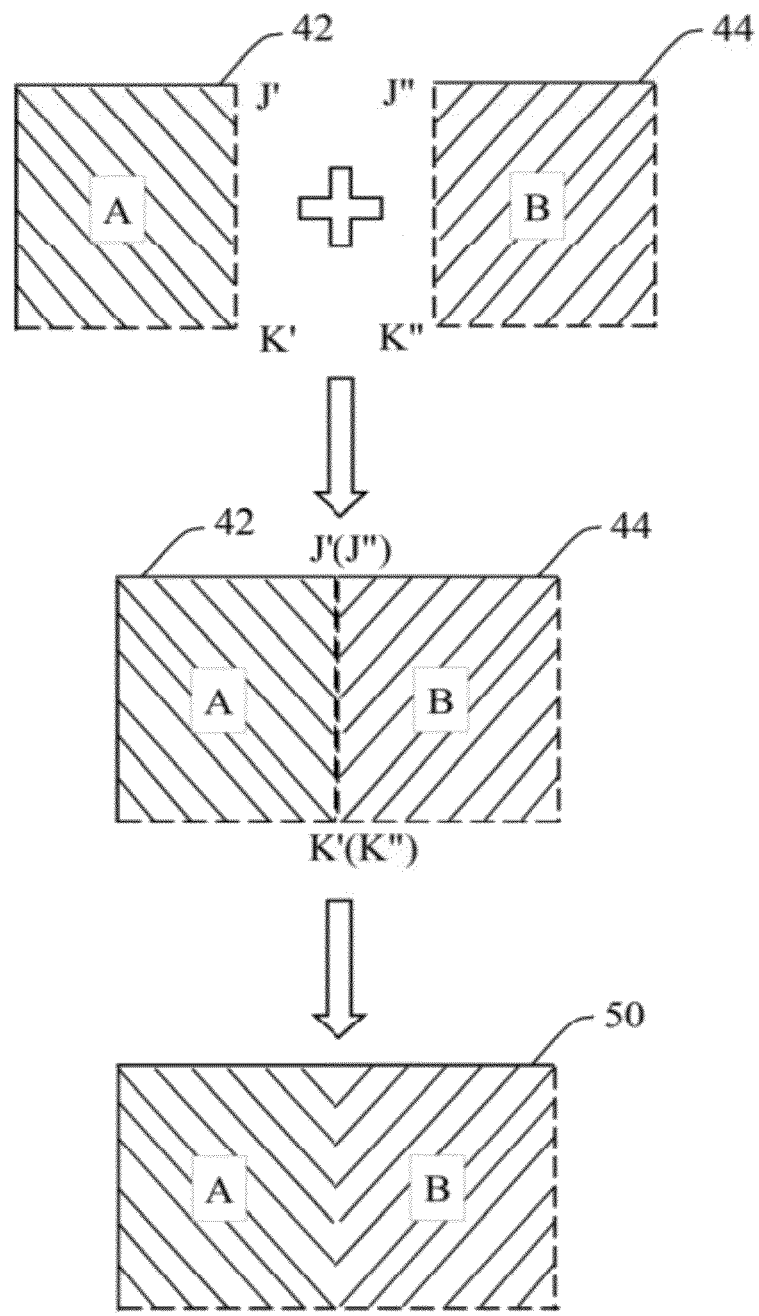
FIG. 5 shows an example of the process involved in combining the two raw images of FIG. 4.

FIG. 5 shows an example of the process involved in combining the two raw images 42 and 44 of FIG. 4. The processing unit 14 may align the two raw images 42 and 44 by overlapping the index lines J'K' and J"K". Then the processing unit 14 may remove the index lines J'K' and J"K" from the combined image. In the same way, the processing unit 14 may combine all the raw images captured by the image sensors 10 and generate a complete image of the document 30.

Figure 6:
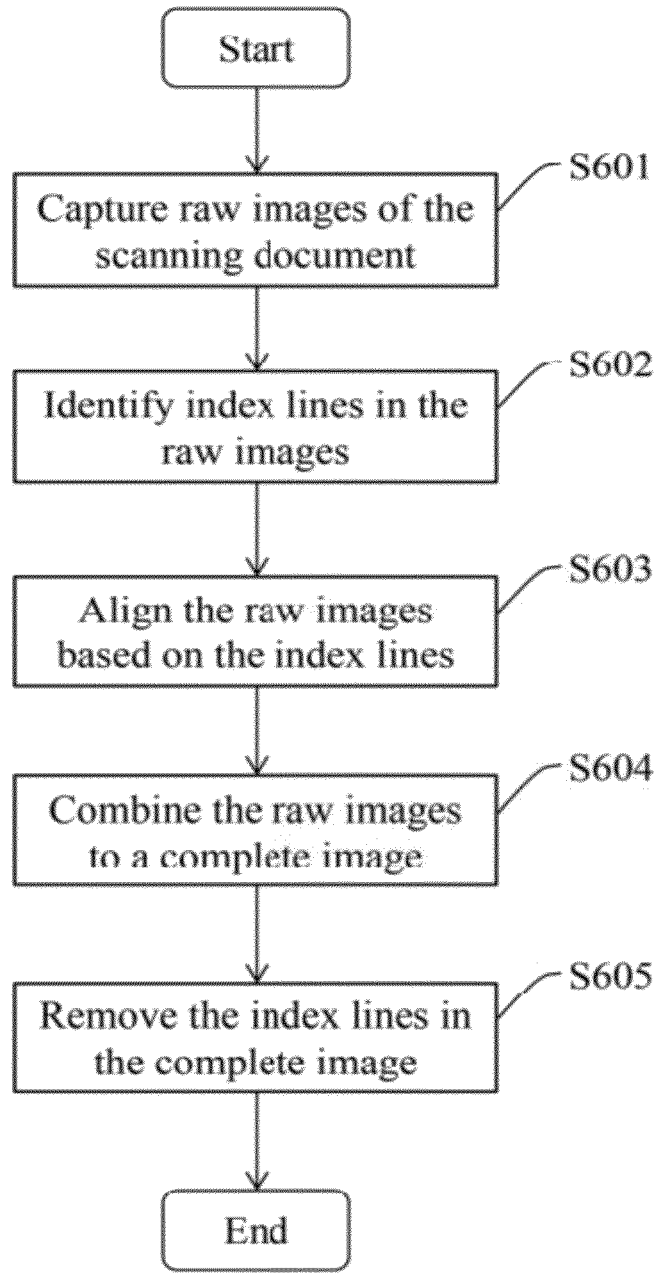
FIG. 6 is a flowchart showing one embodiment of a method for scanning a document using the flatbed scanner illustrated in FIGS. 1 and 2.

FIG. 6 is a flowchart illustrating one embodiment of a method for scanning a document according to the embodiment illustrated in FIGS. 1 and 2. The method may comprise the following steps.

In step S601, the image sensors 10 capture and generate a plurality of raw images of the document 30 through the glass plate 20. Each of the raw images covers a portion of the document 30 and a portion of the plurality of index lines of the calibration pattern 22.

In step S602, the processing unit 14 identifies the plurality of index lines in each of the raw images.

In step S603, the processing unit 14 aligns the raw images by overlapping all of the identified plurality of index lines in the raw images and processing the data accordingly.

In step S604, the processing unit 14 combines the raw image data as aligned and generates a complete image of the document 30.

In step S605, the processing unit 14 removes the plurality of index lines from the data to produce a complete and unlined image.

Although numerous characteristics and advantages have been set forth in the foregoing description of embodiments, together with details of the structures and functions of the embodiments, the disclosure is illustrative only, and changes may be made in detail, especially in the matters of shape, size, and arrangement of parts within the principles of the disclosure to the full extent indicated by the broad general meaning of the terms in which the appended claims are expressed.

In particular, depending on the embodiment, certain steps or methods described may be removed, others may be added, and the sequence of steps may be altered. The description and the claims drawn for or in relation to a method may include some indication in reference to certain steps. However, any indication used is only for illustrative purposes, and not as a suggestion as to a fixed order for the steps.

What is claimed is:

1. An image generating apparatus, comprising:
a glass plate configured to hold a document placed upside down on the glass plate;
a calibration pattern placed on the glass plate, wherein the calibration pattern comprises a plurality of index lines dividing the glass plate into a same number of areas as a number of the plurality of image sensors, each of the plurality of image sensors corresponds to each of the areas, and each of the plurality of index lines has a width less than a predetermined value, the predetermined value is obtained by using an equation as follows:

$$w = \frac{2*h*\sin\theta_i}{\sqrt{n^2 - \sin^2\theta_i}}$$

where w represents the predetermined value, h represents a thickness of the glass plate, $\theta i$ represents one half of a divergence angle of each of the plurality of image sensors, and n represents a refraction index of the glass plate;
a plurality of image sensors arranged under the glass plate, wherein each of the plurality of image sensors is configured to capture and generate a raw image, the raw image covers a portion of the document and a portion of the calibration pattern through the glass plate; and
a processing unit capable of combining all raw images generated by the plurality of image sensors based on the portion of the calibration pattern in the raw image captured by each of the plurality of image sensors, and the processing unit is further configured to generate a complete image of the document.

2. The image generating apparatus of claim 1, wherein the plurality of image sensors is arranged in a two-dimensional matrix.

3. The image generation apparatus of claim 2, wherein the plurality of image sensors is arranged in an M by N matrix, where M and N are integers greater than or equal to two.

4. The image generating apparatus of claim 1, wherein the plurality of index lines are dotted lines or dashed lines.

5. The image generating apparatus of claim 1, wherein the processing unit is further configured to identify portions of the plurality of index lines in the raw image and aligning each raw image based on the portions of the plurality of index lines in the raw image.

6. The image generating apparatus of claim 1, wherein the glass plate comprises a first surface and a second face opposite to the first surface, the document is placed upside down on the first surface, the plurality of index lines is placed on the second surface.

7. The image generating apparatus of claim 1, wherein the processing unit is further configured to remove the calibration pattern from the complete image of the document.

8. The image generation apparatus of claim 1, wherein each of the plurality of image sensors comprises a CMOS imager or a CCD imager.

9. A document scanning method in an image generating apparatus, the method comprising:
providing a glass plate configured to hold a document placed upside down on the glass plate;
providing a calibration pattern placed on the glass plate and a plurality of image sensors arranged under the glass plate, wherein the calibration pattern comprises a plurality of index lines dividing the glass plate into a same number of areas as a number of the plurality of image sensors, each of the plurality of image sensors corresponds to each of the areas, and each of the plurality of index lines has a width less than a predetermined value, the predetermined value is obtained by using an equation as follows:

$$w = \frac{2*h*\sin\theta_i}{\sqrt{n^2 - \sin^2\theta_i}}$$

where w represents the predetermined value, h represents a thickness of the glass plate, $\theta_i$ represents one half of a divergence angle of each of the plurality of image sensors, and n represents a refraction index of the glass plate;

capturing raw images through the glass plate by the plurality of image sensor;

generating raw images of portions of the document and portions of the calibration pattern by the plurality of image sensors; and combining the raw images based on portions of the calibration pattern in the raw images and generating a complete image of the document.

10. The document scanning method of claim 9, further comprising arranging the plurality of image sensors a two-dimensional matrix.

11. The document scanning method of claim 10, further comprising arranging the plurality of image sensors in an M by N matrix, where M and N are integers greater than or equal to two.

12. The document scanning method of claim 9, further comprising providing the plurality of index lines as dotted lines or dashed lines.

13. The document scanning method of claim 9, wherein the combining comprises identifying portions of the plurality of index lines in the raw images, and aligning the raw images based on the portions of the plurality of index lines of the raw images.

14. The document scanning method of claim 9, further comprising providing the glass plate having a first surface and a second surface opposite to the first surface, providing the plurality of index lines on the second face, and scanning the document on the first surface of the glass plate.

15. The document scanning method of claim 9, further comprising removing the calibration pattern from the complete image of the document.

16. The document scanning method of claim 9, further comprising proving each of the plurality of image sensors with a CMOS imager or a CCD imager.

* * * * *